(12) United States Patent
Lim

(10) Patent No.: US 7,053,972 B2
(45) Date of Patent: May 30, 2006

(54) CHIP-ON-GLASS ARRAY SUBSTRATE OF LIQUID CRYSTAL DISPLAY DEVICE AND METHOD OF FABRICATING THE SAME

(75) Inventor: Joo-Soo Lim, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 36 days.

(21) Appl. No.: 10/872,417

(22) Filed: Jun. 22, 2004

(65) Prior Publication Data

US 2005/0041191 A1   Feb. 24, 2005

(30) Foreign Application Priority Data

Aug. 21, 2003   (KR) ...................... 10-2003-0057793

(51) Int. Cl.
*G02F 1/1345* (2006.01)

(52) U.S. Cl. ...................... 349/152; 349/151

(58) Field of Classification Search ................ 349/151, 349/152, 43

See application file for complete search history.

(56) References Cited

U.S. PATENT DOCUMENTS

| 6,055,034 | A * | 4/2000 | Zhang et al. ................ 349/151 |
| 6,115,097 | A * | 9/2000 | Yamazaki .................... 349/151 |
| 6,288,764 | B1 * | 9/2001 | Zhang et al. ................ 349/152 |
| 6,373,546 | B1 * | 4/2002 | Kim ............................ 349/152 |
| 6,404,479 | B1 * | 6/2002 | Zhang et al. ................ 349/152 |
| 6,577,372 | B1 * | 6/2003 | Zhang et al. ................ 349/152 |
| 6,943,859 | B1 * | 9/2005 | Yoo et al. .................... 349/139 |
| 6,952,251 | B1 * | 10/2005 | Lee ............................. 349/152 |
| 2001/0046016 | A1 * | 11/2001 | Park et al. ................... 349/139 |
| 2003/0038901 | A1 * | 2/2003 | Baek et al. .................. 349/43 |
| 2004/0125293 | A1 * | 7/2004 | Cheng et al. ............... 349/122 |
| 2004/0141140 | A1 * | 7/2004 | Zhang et al. ............... 349/152 |
| 2005/0179829 | A1 * | 8/2005 | Park et al. ................... 349/44 |

* cited by examiner

*Primary Examiner*—James A. Dudek
(74) *Attorney, Agent, or Firm*—Morgan Lewis & Bockius LLP

(57) ABSTRACT

An array substrate device for a liquid crystal display device includes a gate line, a gate pad connected to a first end of the gate line, a gate insulating layer covering the gate line and the gate pad, a data line over the gate insulating layer and crossing the gate line to define a pixel region, a data pad connected to a first end of the data line, a thin film transistor disposed at a crossing region of the gate and data lines, a first inorganic insulating layer formed on the substrate covering the thin film transistor, the data line, and the data pad, a first organic insulating layer along an entire surface of the first inorganic insulation layer except at portions corresponding to the gate and data pads, a transparent pixel electrode disposed over the first organic insulating layer and connected to the thin film transistor, and a transparent gate pad terminal and a data pad terminal disposed over the first organic insulating layer and connected to the gate and data pads, respectively.

7 Claims, 21 Drawing Sheets

CHIP-ON-GLASS ARRAY SUBSTRATE OF LIQUID CRYSTAL DISPLAY DEVICE AND METHOD OF FABRICATING THE SAME

The present invention claims the benefit of Korean Patent Application No. P2003-0057793, filed in Korea on Aug. 21, 2003, which is hereby incorporated by reference.

BACKGROUND OF THE INVENTION

1. Field of the Invention

The present invention relates to a liquid crystal display (LCD) device, and more particularly, to an array substrate chip-on-glass (COG) type array substrate of an LCD device.

2. Discussion of the Related Art

In general, an LCD device includes a liquid crystal panel having upper and lower substrates and a liquid crystal layer disposed between the upper and lower substrates, wherein peripheral portions of the upper and lower substrates are sealed together by a sealant to prevent leakage of the liquid crystal layer. The upper substrate, which is commonly referred to as a color filter substrate, includes a common electrode and color filters. The lower substrate, which is commonly referred to as an array substrate, includes gate lines arranged along a transverse direction and data lines arranged along a longitudinal direction perpendicular to the gate lines. In addition, a pixel electrode is formed within a pixel region of the lower substrate defined by crossing regions of the gate and data lines, and a thin film transistor (TFT) is formed to function as a switching element at the crossing regions of the gate and data lines in a matrix. The TFT includes a gate electrode, a source electrode, and a drain electrode, wherein the drain electrode contacts the pixel electrode via a drain contact hole. Accordingly, the gate lines transmit scanning signals to the gate electrode, and the data lines transmit data signals to the source electrode. Thus, the data signals change alignment of liquid crystal molecules of the liquid crystal layer according to the scanning signals in order to display images having various gray levels by the LCD device.

Operation of the LCD device makes use of optical anisotropy and polarization properties of the liquid crystal molecules in order to generate desired images. For example, the liquid crystal molecules have specific alignments due to their specific characteristics that can be modified by an induced electric field. Accordingly, since the electric fields induced to the liquid crystal molecules can change the specific alignments of the liquid crystal molecules, incident light is refracted according to the specific alignments of the liquid crystal molecules due to the optical anisotropy of the liquid crystal molecules.

Each of the upper and lower substrates have electrodes that are spaced apart and face into each other. Accordingly, when the electric field is induced to the liquid crystal material through the electrodes of each substrate, alignment directions of the liquid crystal molecules are changed in accordance with the applied voltage to display images. By controlling the induced voltage, the LCD device provides various light transmittances to display images.

Among the different types of LCD devices, active matrix LCD (AM-LCD) devices having TFTs and pixel electrodes arranged in a matrix configuration produce high resolution images, and produce superior moving images. In the AM-LCD devices, driver integrated circuits (IC) apply signals to each electrode through a plurality of conductive lines disposed on the lower substrate, and may be mounted using various methods, such as chip on board (COB), tape carrier package (TCP), and chip on glass (COG) methods.

The COB method is commonly adopted for segment-type LCD devices, or for LCD panels having low resolution. Since the segment-type LCD devices or the low resolution LCD panels use small numbers of leads, the driver ICs thereof also have small numbers of leads. Accordingly, the driver ICs thereof are first installed on a printed circuit board (PCB) having a plurality of leads, and the leads of the PCB are connected with the LCD panel via one of the various methods described above. However, as resolution of LCD devices has increased, an increased number of leads are required for the driver ICs. Thus, when the number of leads increases, it is difficult to install the driver ICs on the PCB.

According to the TCP method, the driver ICs are installed onto a polymer film. Thus, the TCP method is commonly used for LCD devices that require small, thin, light weight packages, such as mobile phones.

According to the COG method, the driver ICs are directly installed onto the LCD panel without the use of an interposing PCB. Thus, electrical connections between the driver ICs and the LCD panel is miniaturized, wherein a pitch between adjacent leads of the driver ICs is relatively small. The COG method employs a multi-layered flexible printed circuit board (FPCB) instead of the PCB, wherein the multi-layered FPCB contacts the LCD panel via an anisotropic conductive film (ACF) and transmits input signals to the driver ICs.

Although the COG method has advantages, such as low cost and high stability, since a pad of the LCD panel requires an additional area to install the driver ICs, the LCD panel must be enlarged. In addition, by using the COG method, it is difficult to remove and repair defective ones of the driver ICs or to repair terminal lines of the LCD panel.

FIG. 1 is a schematic plan view of an LCD panel having a COG-type IC according to the related art, and FIG. 2 is a cross sectional view along II—II of FIG. 1 according to the related art. In FIGS. 1 and 2, a first substrate 10 is attached and aligned with a second substrate 50 such that the attached first and second substrates 10 and 50 constitute an LCD panel L.P. The first substrate 10 includes a plurality of gate and data pads (no shown) and IC chips 60 and 62 in electrical communication with the gate and data pads. The IC chips 60 and 62 are disposed along peripheries of the first substrate 10 that are not overlapped by the second substrate 50. Although not shown, the first substrate 10 includes a plurality of gate and data lines that perpendicularly cross one another to define a plurality of pixel regions, wherein the gate pad is disposed at each end of the gate lines, and the data pad is placed at each one end of the data lines. Specifically, the gate pads are located along the periphery where the gate driving IC chip 60 is placed such that the gate diving IC chip 60 is connected to the gate pads. Accordingly, the data pads are located along the periphery where the data driving IC chip 60 is placed such that the data driving IC chip 62 is connected to the data pads. In FIG. 2, a multi-layered flexible printed circuit board (FPCB) 70 is connected to the first substrate 10 through an anisotropic conductive film 80 to supply the driving signals to the driving IC ships 60 and 62.

FIG. 3 is a partially enlarged plan view of an array substrate according to the related art. In FIG. 3, an array substrate 10 includes a plurality of gate lines 14 disposed along a transverse direction and a plurality of data lines 28 disposed along a longitudinal direction, wherein the plurality of gate lines 14 and the plurality of data lines 28 cross one another to define pixel regions P. Each of the gate lines 14 and each of the data lines 28 include a gate pad 16 and a data pad 30, respectively, disposed at ends of each of the gate lines 14 and at ends of each of the data lines 28. In addition, a gate pad terminal 46 is disposed over the gate pad 16, and a data pad terminal 48 is disposed over the data pad 30. A TFT T is formed at each of the crossing portions of the gate lines 14 and the data lines 28, and may include a gate electrode 12, an active layer 20, a source electrode 24, and a drain electrode 26. A pixel electrode 44 may be disposed within the pixel region P defined by the gate and data lines 14 and 28, wherein the pixel electrode 44 and the gate and data pads terminals 46 and 48 are formed of a transparent conductive material. The cross-sectional structure of the aforementioned TFT and the gate and data pads will be explained in detail with reference to FIGS. 4–6.

FIG. 4 is a cross sectional view along IV—IV of FIG. 3 according to the related art, FIG. 5 is a cross sectional view along V—V of FIG. 3 according to the related art, and FIG. 6 is a cross sectional view along VI—VI of FIG. 3 according to the related art. In FIGS. 4–6, a switching region S, a pixel region P, a gate pad region G, and a data pad region D are defined on a substrate 10, wherein the gate electrode 12 is formed on the substrate 10 within the switching region S. As shown in FIG. 3, the gate line 14 is also disposed on the substrate 10, and the gate electrode 12 extends from the gate line 14. In FIG. 5, the gate pad 16 is formed on the substrate 10 within the gate pad region G, and is connected to the end of the gate line 14 (in FIG. 3). Then, a gate insulating layer 18, which is formed of an inorganic material, is formed on the substrate 10 covering the gate electrode 12, the gate line 14, and the gate pad 16. Next, an active later 20 is formed on the gate insulating layer 18, and an ohmic contact layer 22 is disposed on the active layer 20. Specifically, the active and ohmic contact layers 20 and 22 are disposed over the gate electrode 12, the source and drain electrodes 24 and 26 are disposed over the active layer 20 and are in contact with the ohmic contact layer 22, respectively. The data line 28 is disposed on the gate insulating layer 18, and the data pad 30 is also disposed on the gate insulating layer 18 within the data pad region D.

In FIG. 3, the data pad 30 is connected to the end of the data line 28. Accordingly, the TFT T including the gate electrode 12, the active layer 20, the ohmic contact layer 22, the source electrode 24, and the drain electrode 26 is formed over the substrate 10 within the switching region S, and the gate and data pads 16 and 30 are formed within the gate and data pad regions G and D, respectively.

Then, a first passivation layer 32 of an inorganic material is formed along an entire surface of the substrate 10 to cover the TFT T and the gate and data pads 16 and 30. Next, a second passivation layer 34 is disposed along an entire surface of the first passivation layer 32, and a third passivation layer 36 is disposed along an entire surface of the second passivation layer 34. The second passivation layer 34 is an organic material, while the first and third passivation layers 32 and 36 are an inorganic material. The organic material for the second passivation layer 34 may be, for example, benzocyclobutene (BCB) or acrylic resin, and the inorganic material for the first and third passivation layers 32 and 36 may be, for example, silicon nitride ($SiN_x$) or silicon oxide ($SiO_2$).

The first passivation layer 32 of inorganic material functions as a buffer layer to protect the active layer 20 from the passivation layer 34 formed of organic material. If the organic second passivation layer 36 contacts the active layer 20, a trap potential that interrupts carrier movement within a channel region of the TFT T may occur along an interface between the active layer 20 and the second passivation layer, thereby deteriorating operational characteristics of the TFT T. Therefore, the inorganic first passivation layer 32 is interposed between the TFT T and the organic second passivation layer 34.

Since the organic material for the second passivation layer 34 usually has a dielectric constant of less than 3, cross talk is prevented between the pixel electrode 44 and the lines 14 and 28. In addition, although the pixel electrode 44 extends over the gate and data lines 14 and 28, the second passivation layer 34 increases aperture ratio. When the organic material is utilized for the passivation layer, the aperture ratio is raised according to an extension of the pixel electrode 44. Accordingly, the third passivation layer 36 functions to interrupt light incident to the active layer 20.

After forming the third passivation layer 36 and before forming the pixel electrode 44, the first, second, and third passivation layers 32, 34, and 36 are simultaneously patterned to form first, second, and third contact holes H1, H2, and H3. The first contact hole H1 exposes a portion of the drain electrode 26, the second contact hole H2 exposes a portion of the gate pad 16, and the third contact hole H3 exposes a portion of the data pad 30. The second contact hole H2 penetrates the first, second, and third passivation layers 32, 34, and 36 and the gate insulating layer 18, whereas the first and second contact holes H1 and H3 penetrate only the first, second, and third passivation layers 32, 34, and 36.

After patterning the first, second, and third passivation layers 32, 34, and 36, the pixel electrode 44 is formed on the third passivation layer 36 to correspond to the pixel region P. Furthermore, when forming the pixel electrode 44, the gate and data pad terminals 46 and 48 are formed within the gate and data pad regions G and D, respectively. Accordingly, the pixel electrode 44 contacts the drain electrode 26 through the first contact hole H1, the gate pad terminal 46 contacts the gate pad 16 through the second contact hole H2, and the data pad terminal 48 contacts the data pad 30 through the third contact hole H3.

In FIGS. 3–6, the organic passivation layer is necessary in order to obtain the high aperture ratio. However, the structure causes some disadvantages within the gate and data pad regions G and D when installing the IC chips on the array substrate.

FIG. 7 is a cross sectional view along V—V of FIG. 3 of a gate pad region during application of an IC chip according to the related art. In FIG. 7, the first, second, and third passivation layers 32, 34 and 36 are simultaneously etched to form the second contact hole H2 that exposes the portion of the gate pad 16. However, during simultaneous etching of the first, second, and third passivation layers 32, 34, and 36, abnormal etching occurs due to the inorganic first and third passivation layers 32 and 36 and the organic second passivation layer 34 having different etching selectivities. For example, one of the organic and inorganic layers is overetched during the patterning process such that the second hole H2 may have uneven surfaces along sidewalls of the second hole H2. Accordingly, the gate pad terminal 46 may be damaged, thereby creating an electrical open circuit condition. In addition, the electrical open circuit condition will be created within the data pad region D.

As a result, when the IC chip 60, having a bump 60a, is attached to the gate pad terminal 46 during the COG process, the IC chip 60 is electrically isolated from the gate pad 16. When the bump 60a of the IC chip 60 is larger than the second contact hole H2, the bump 60a is disposed on and in contact with the gate pad terminal 46. However, since the gate pad terminal 46 is damaged within the second contact hole H2, the gate pad terminal 46 does not electrically connect the gate pad 16 to the bump 60a of the IC chip 60, and the IC chip 60 is placed into an electrically floating state with respect to the gate pad 16. Thus, the IC chip 60 can not supply the signals to the gate pad 16.

FIG. 8 is a cross sectional view along V—V of FIG. 3 of another gate pad region during application of an IC chip according to the related art. In FIG. 8, since the bump 60a of the IC chip 60 has a relatively small size to fit within the second contact hole H2, the bump 60a impacts the gate pad terminal 46. Accordingly, the gate pad terminal 46 becomes detached from organic second passivation layer 34 and is damaged. Thus, the IC chip 60 is not electrically connected with the gate pad 16.

When the damage is created to the gate pad terminal 46, the IC chip 60 or the flexible printed circuit board (FPCB) 70 (in FIG. 2) is removed from the array substrate and a re-work process for re-attaching the IC chip 60 to the gate pad terminal 46 is performed. However, when removing the IC chip 60 or the FPCB 70 (in FIG. 2), the gate pad terminal 46 may be damaged such that a subsequent re-work process may not be performed since the gate pad terminal 46 is damaged beyond repair.

SUMMARY OF THE INVENTION

Accordingly, the present invention is directed to a chip-on-glass (COG) array substrate of an LCD device and a method of fabricating a chip-on-glass (COG) array substrate of an LCD device that substantially obviates one or more of the problems due to limitations and disadvantages of the related art.

An object of the present invention is to provide an array substrate having pad structures that prevent damage.

Another object of the present invention is to provide a method of fabricating an array substrate having pad structures that prevent damage.

Another object of the present invention is to provide an array substrate having pad structures to afford stable attachment of IC chips.

Another object of the present invention is to provide a method of fabricating an array substrate having pad structures to afford stable attachment of IC chips.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate device for a liquid crystal display device includes a gate line disposed along a first direction on a substrate, a gate pad on the substrate and connected to a first end of the gate line, a gate insulating layer on the substrate covering the gate line and the gate pad, a data line disposed along a second direction over the gate insulating layer and crossing the gate line to define a pixel region, a data pad connected to a first end of the data line, a thin film transistor disposed at a crossing region of the gate and data lines, a first inorganic insulating layer formed on the substrate covering the thin film transistor, the data line, and the data pad, a first organic insulating layer along an entire surface of the first inorganic insulation layer except at portions corresponding to the gate and data pads, a transparent pixel electrode disposed over the first organic insulating layer and connected to the thin film transistor, and a transparent gate pad terminal and a data pad terminal disposed over the first organic insulating layer and connected to the gate and data pads, respectively.

In another aspect, A method of fabricating an array substrate device for a liquid crystal display device includes forming a gate line and a gate pad on a substrate, the gate line disposed along a first direction and the gate pad is connected to a first end of the gate line, forming a gate insulating layer over the substrate to cover the gate line and the gate pad, forming a data line and a data pad over the gate insulating layer, the data line disposed along a second direction to cross the gate line to define a pixel region, and the data pad is connected to a first end of the data line, forming a thin film transistor at a crossing region of the gate and data lines, sequentially forming a first inorganic insulating layer and a first organic insulating layer over the substrate to cover the thin film transistor, the data line, and the data pad, patterning the first organic insulating layer to expose portions of the first inorganic insulating layer corresponding to the gate and data pads, forming a second inorganic insulating layer over the patterned first organic insulating layer and over the exposed portions of the first organic insulating layer, simultaneously patterning the second inorganic insulating layer, the first organic insulating layer, and the first inorganic insulating layer to form first, second, and third contact holes, and forming a transparent pixel electrode, and a transparent gate pad terminal, and a data pad terminal over the second inorganic insulating layer, wherein the pixel electrode contacts a portion of the thin film transistor through the first contact hole, and the gate pad terminal and data pad terminal contact the gate and data pads through the second and third contact holes, respectively.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments, examples of which are illustrated in the accompanying drawings.

Figure 1:
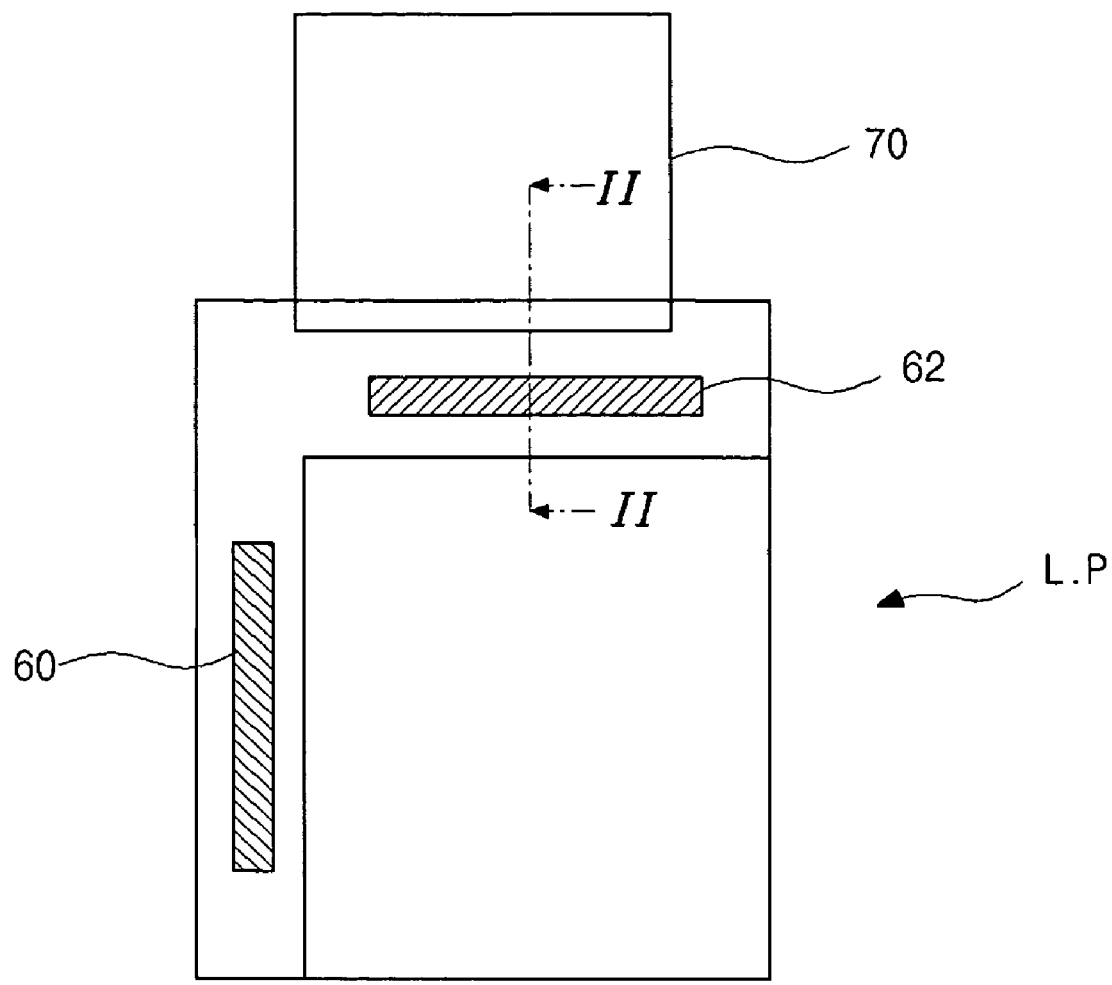
FIG. 1 is a schematic plan view of an LCD panel having a COG-type IC according to the related art.
Figure 2:
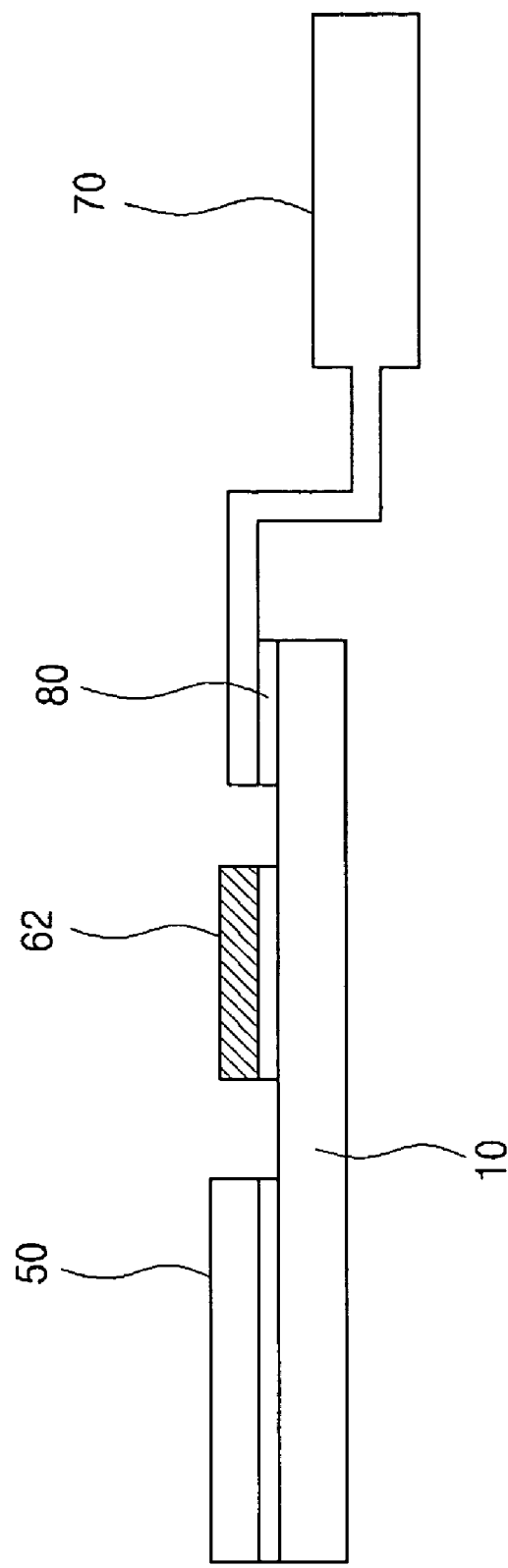
FIG. 2 is a cross sectional view along II—II of FIG. 1 according to the related art.
Figure 3:
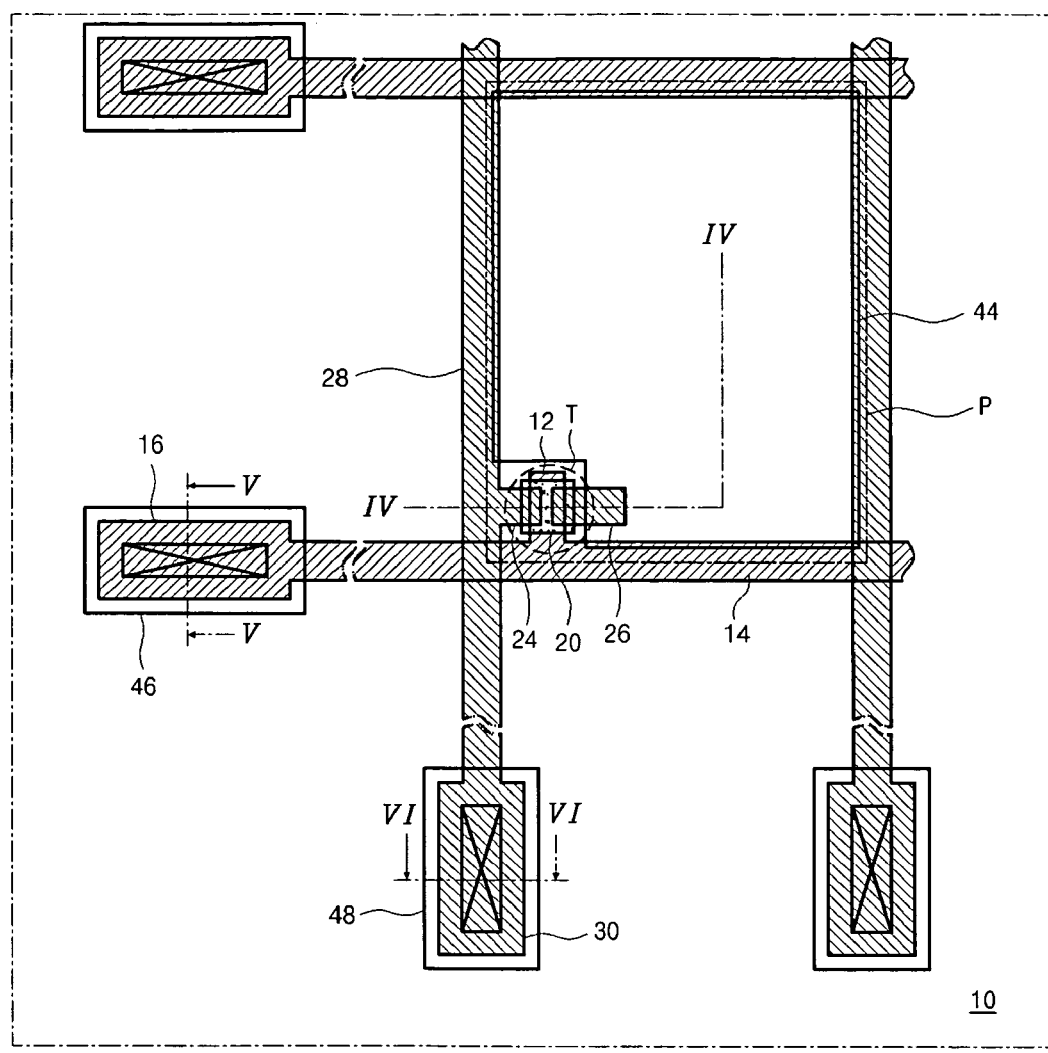
FIG. 3 is a partially enlarged plan view of an array substrate according to the related art.
Figure 4:
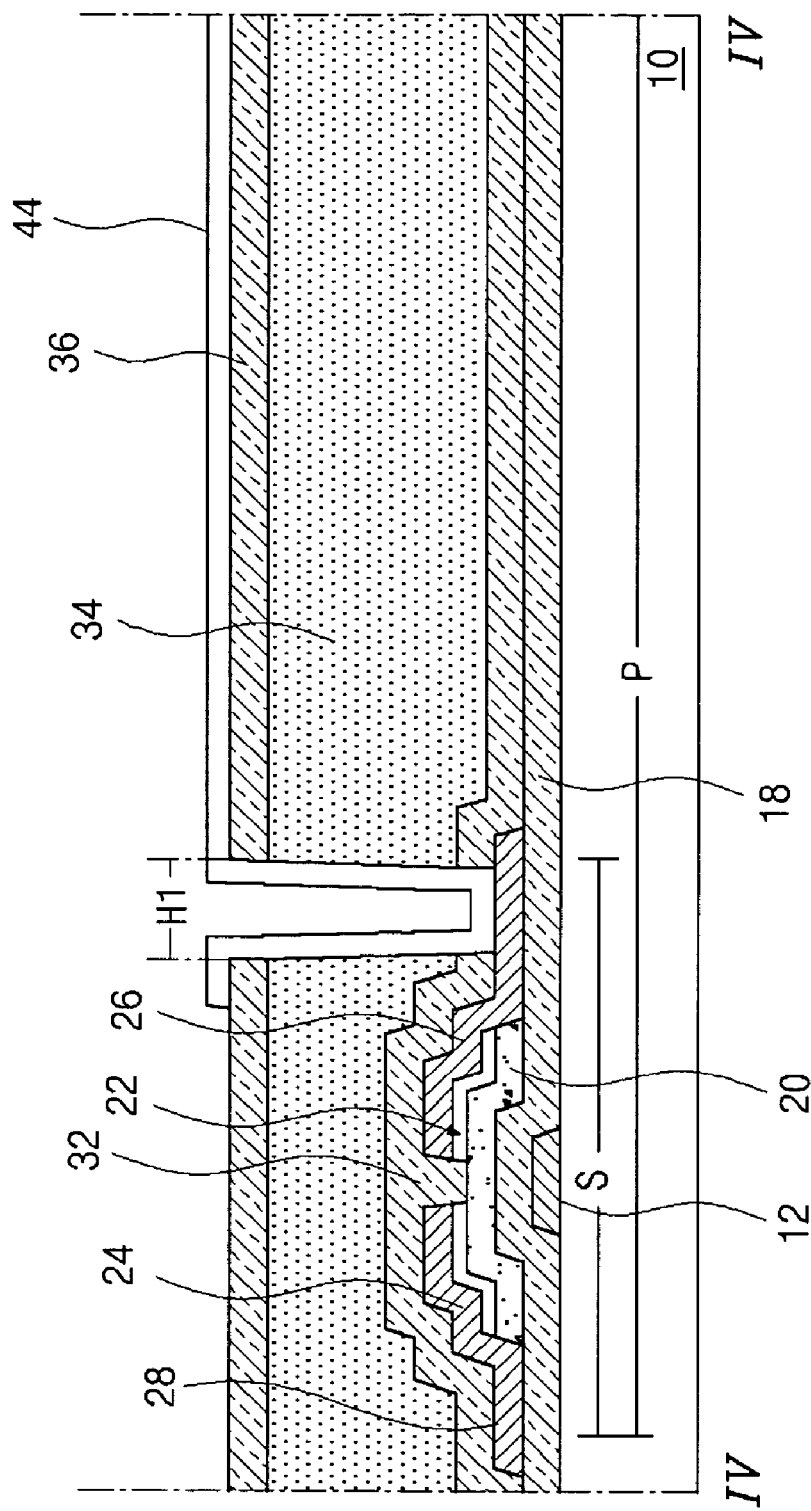
FIG. 4 is a cross sectional view along IV—IV of FIG. 3 according to the related art.
Figure 5:
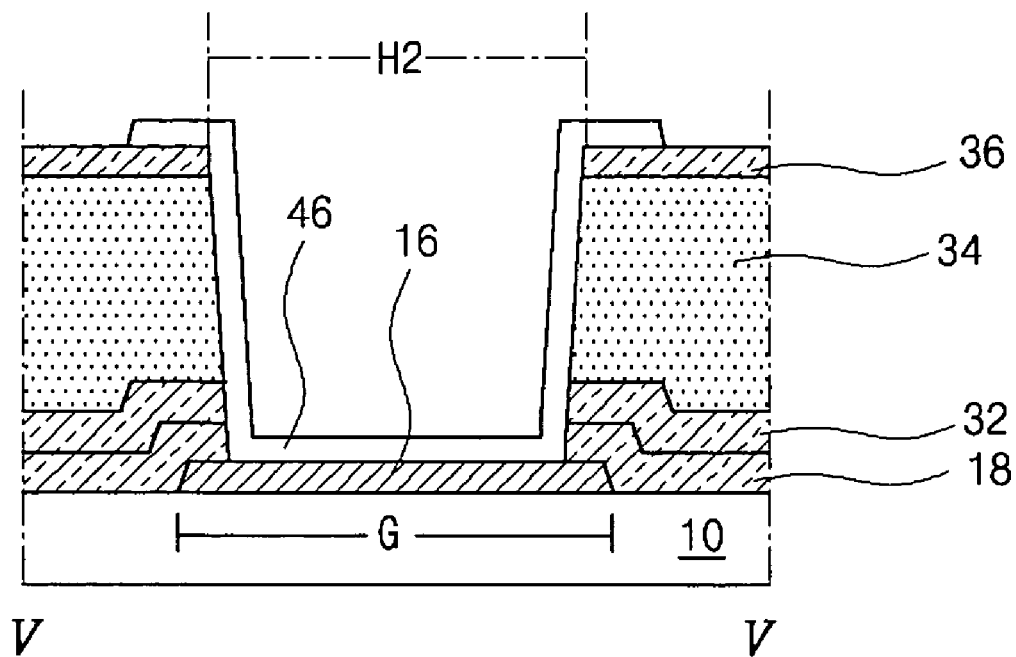
FIG. 5 is a cross sectional view along V—V of FIG. 3 according to the related art.
Figure 6:
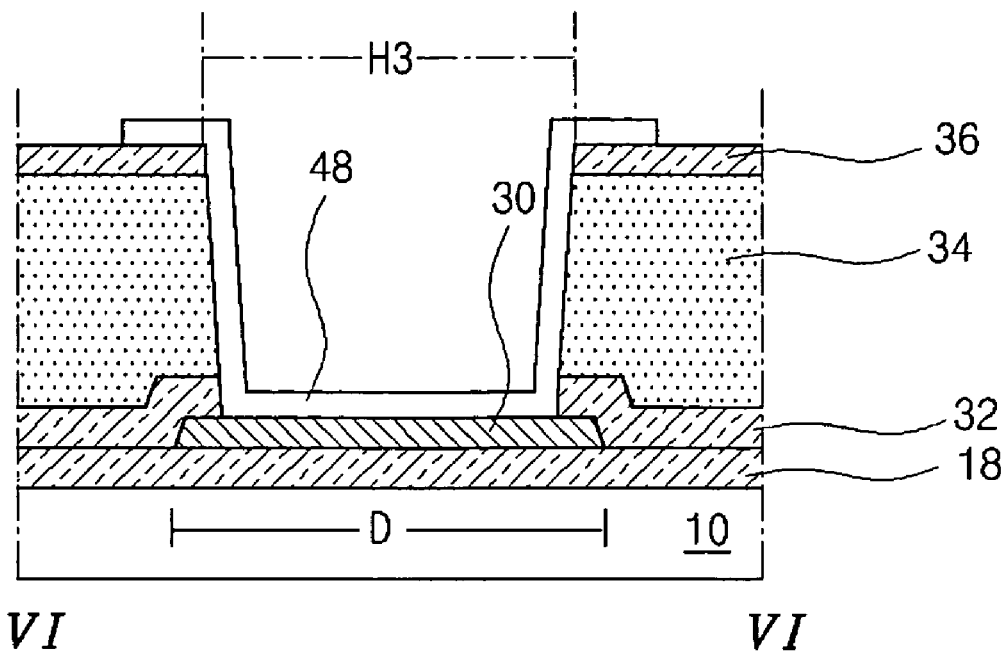
FIG. 6 is a cross sectional view along VI—VI of FIG. 3 according to the related art.
Figure 7:
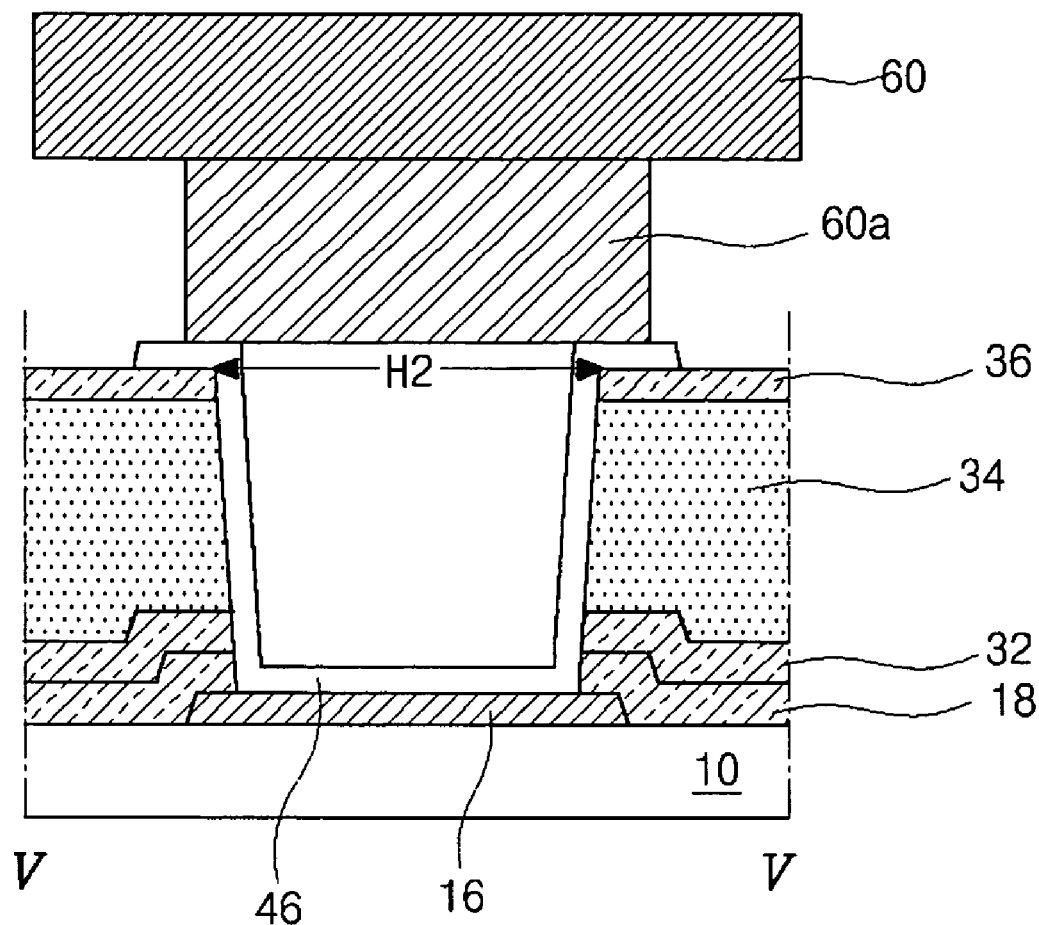
FIG. 7 is a cross sectional view along V—V of FIG. 3 of a gate pad region during application of an IC chip according to the related art.
Figure 8:
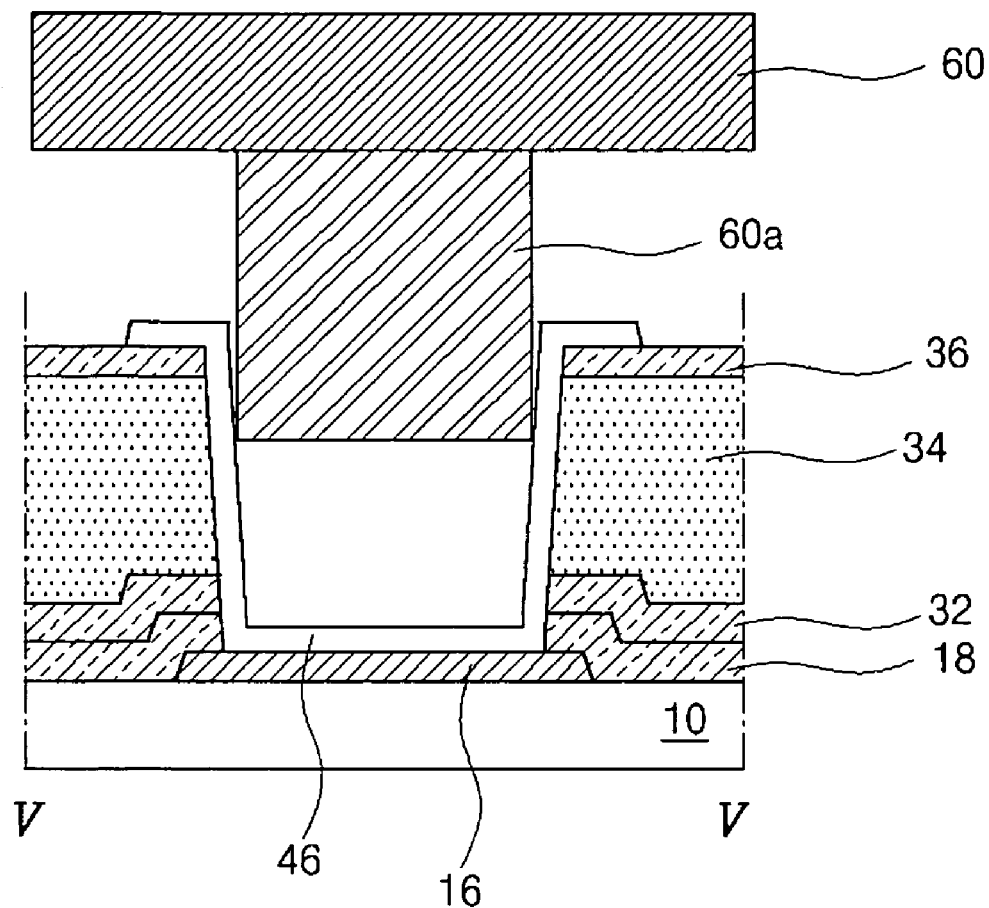
FIG. 8 is a cross sectional view along V—V of FIG. 3 of another gate pad region during application of an IC chip according to the related art.
Figure 9:
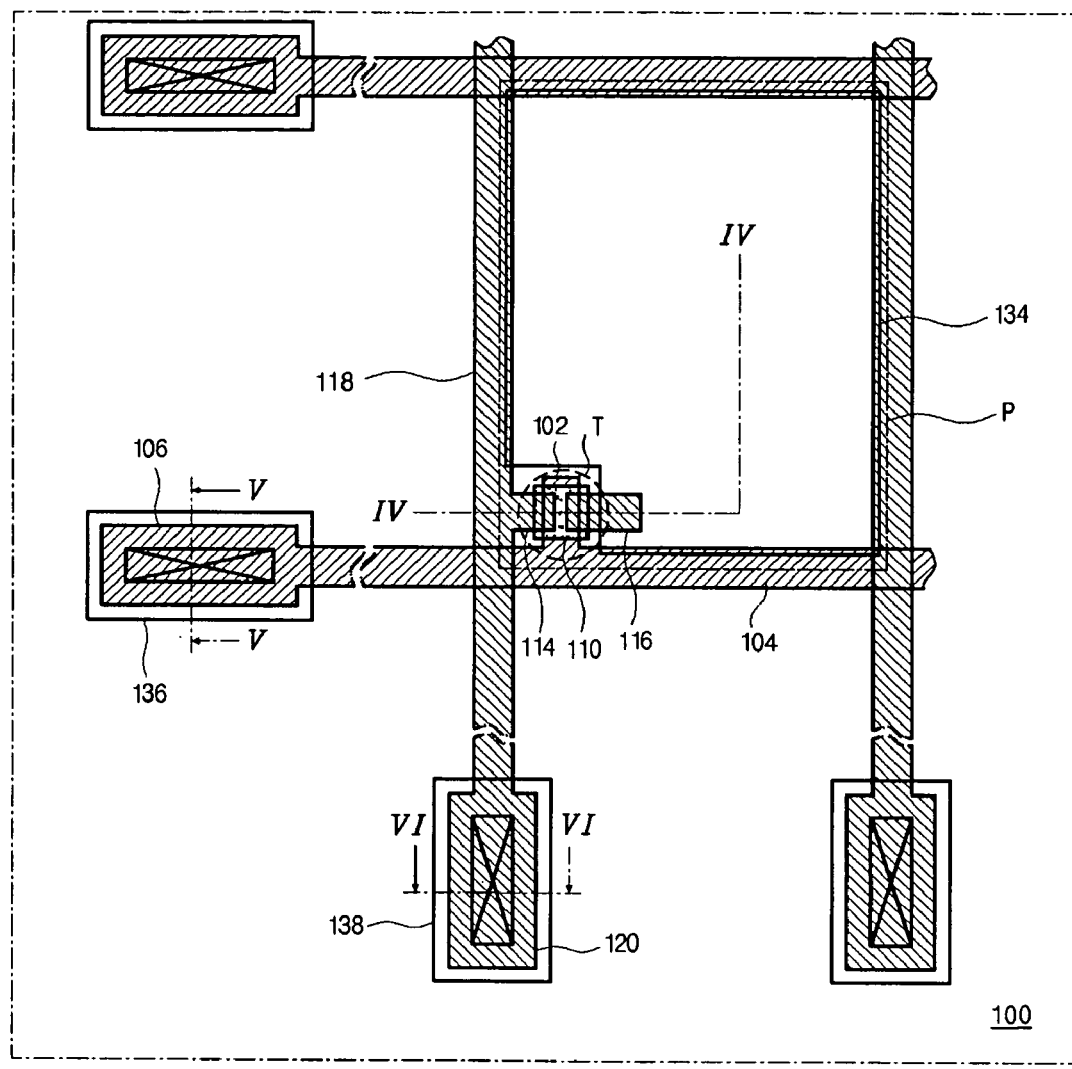
FIG. 9 is an enlarged plan view of an exemplary array substrate for an LCD device according to the present invention.
Figure 11A:
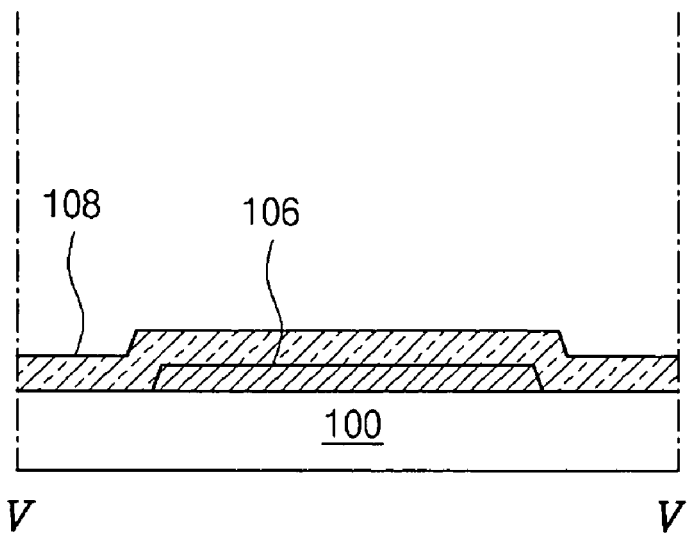
FIGS. 11A–11G are cross sectional views along V—V of FIG. 9 of another exemplary method of fabricating an array substrate according to the present invention.
Figure 11B:
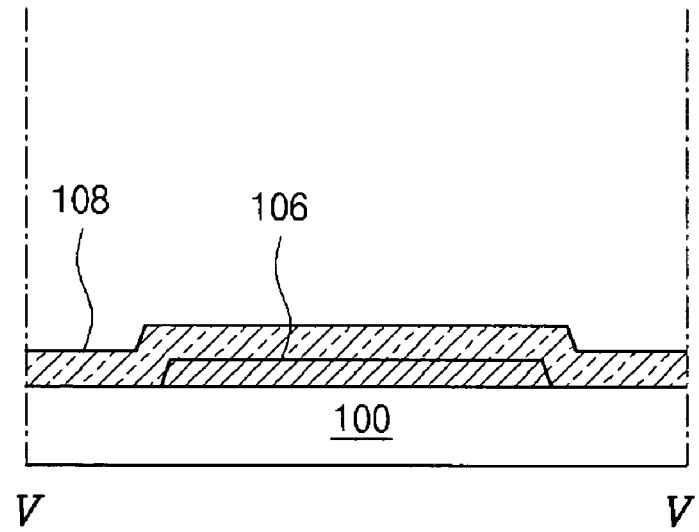
Figure 11C:
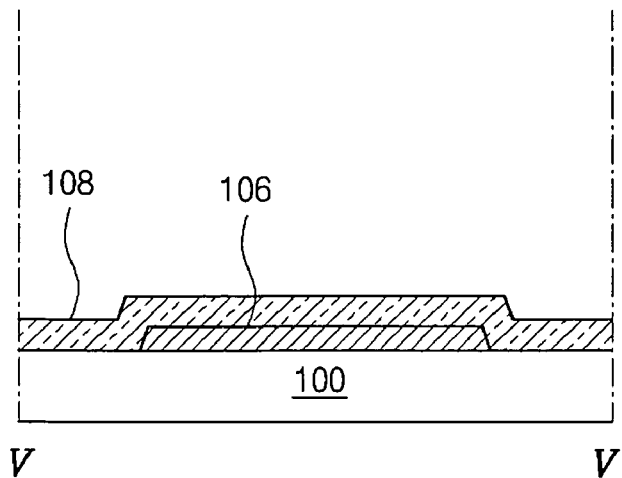
Figure 11D:
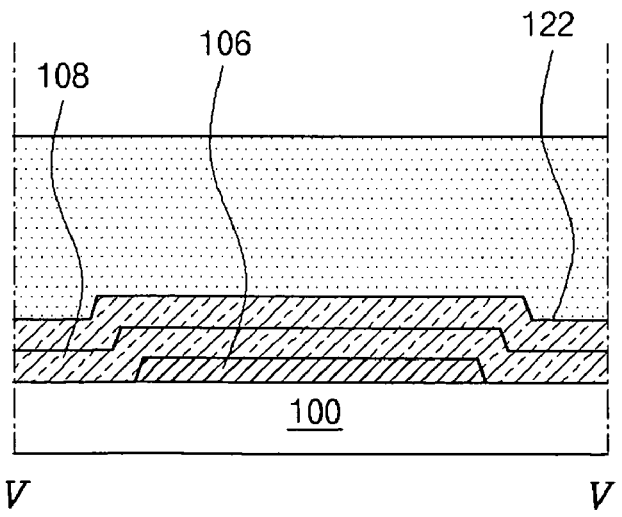
Figure 11E:
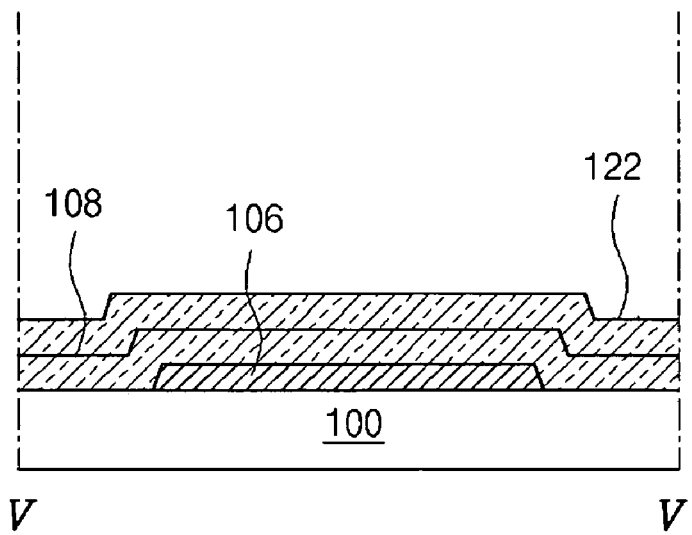
Figure 11F:
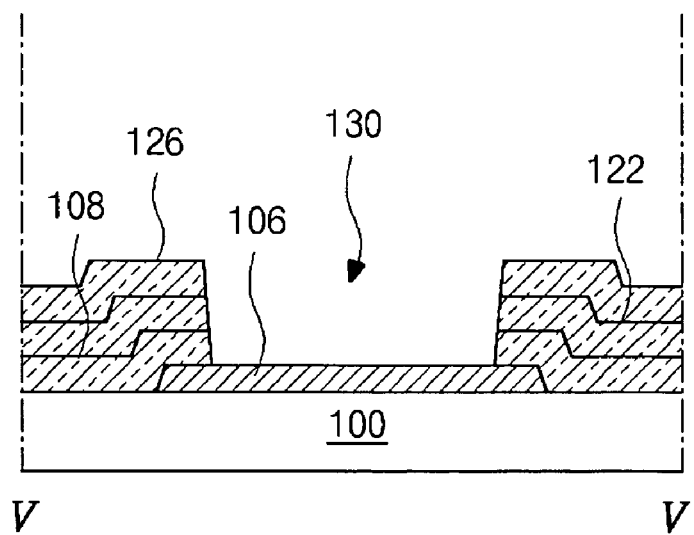
Figure 11G:
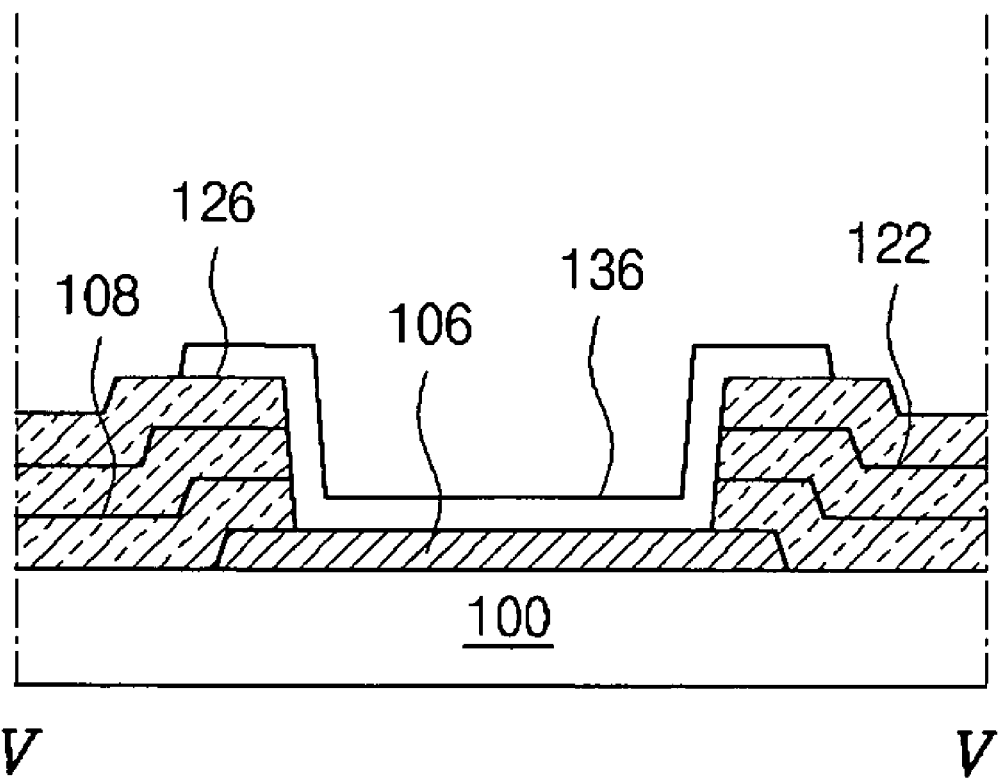
Figure 12A:
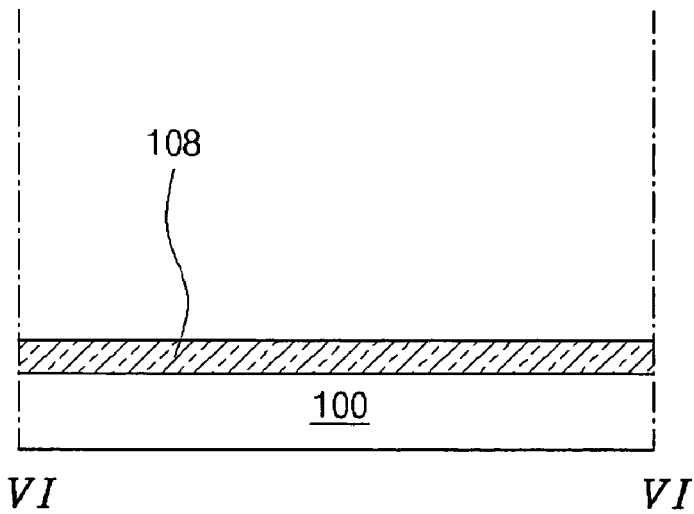
FIGS. 12A–12G are cross sectional views along V—V of FIG. 9 of another exemplary method of fabricating an array substrate according to the present invention.
Figure 12B:
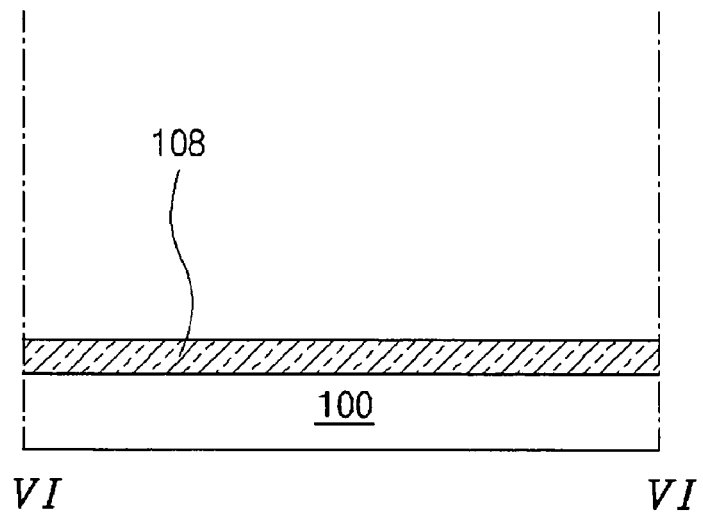
Figure 12C:
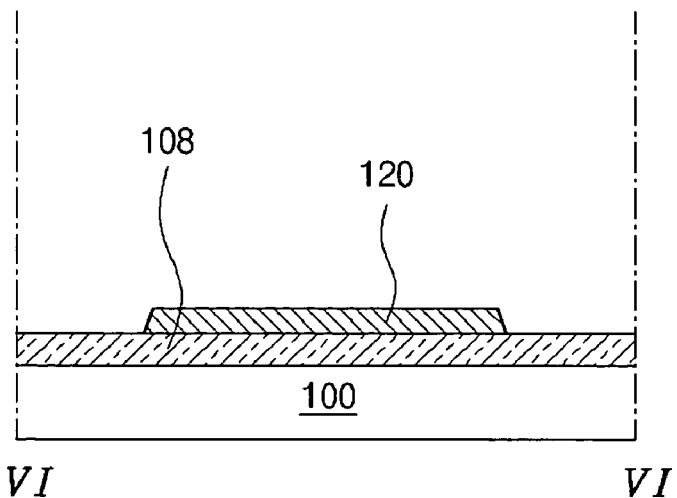
Figure 12D:
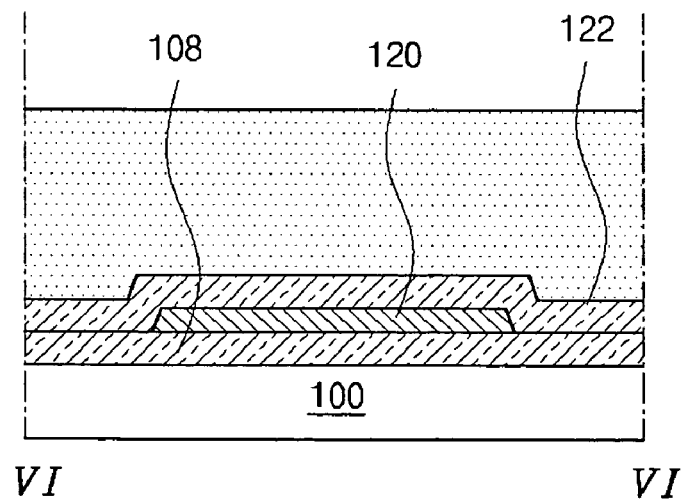
Figure 12E:
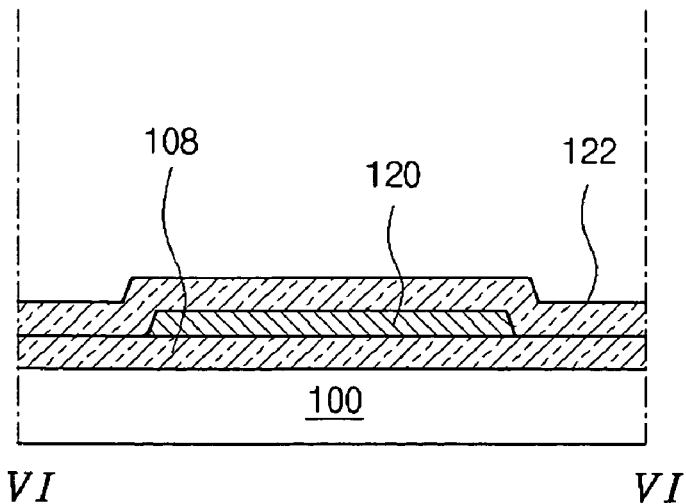
Figure 12F:
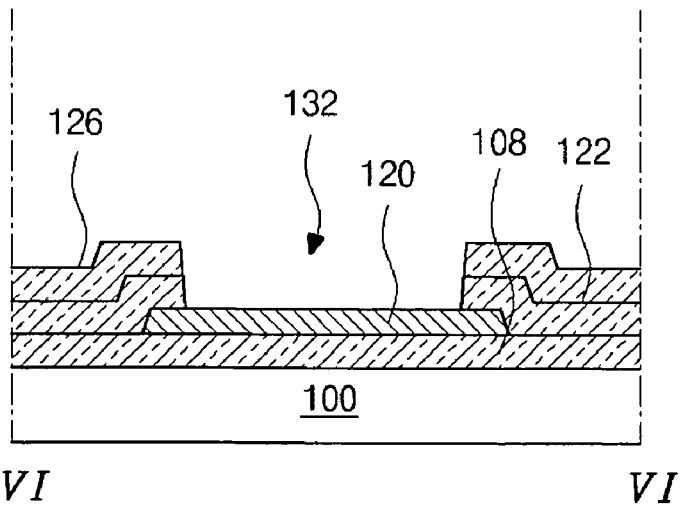
Figure 12G:
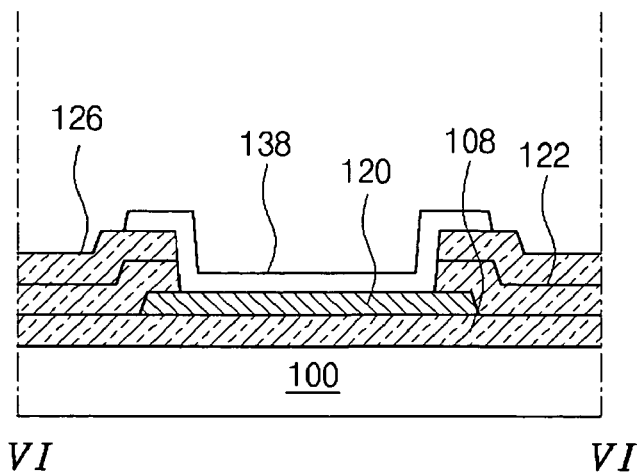
Figure 13:
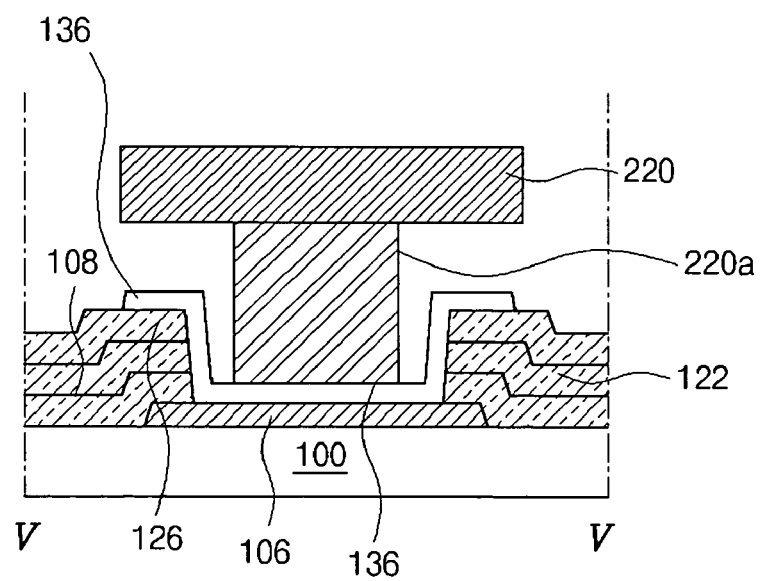
FIG. 13 is a cross sectional view along V—V of FIG. 9 of an exemplary gate pad region during application of an IC chip according to the present invention.

FIG. 9 is an enlarged plan view of an exemplary array substrate for an LCD device according to the present invention, FIGS. 10A–10G are cross sectional views along IV—IV of FIG. 9 of an exemplary method of fabricating an array substrate according to the present invention, FIGS. 11A–11G are cross sectional views along V—V of FIG. 9 of another exemplary method of an array substrate according to the present invention, FIGS. 12A–12G are cross sectional views along V—V of FIG. 9 of another exemplary method of fabricating an array substrate according to the present invention, and FIG. 13 is a cross sectional view along V—V of FIG. 9 of an exemplary gate pad region during application of an IC chip according to the present invention.

Figure 10A:
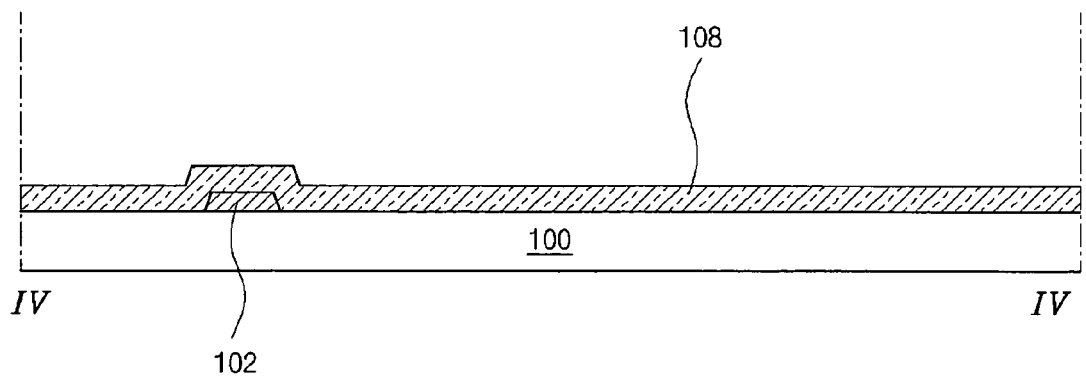
FIGS. 10A–10G are cross sectional views along IV—IV of FIG. 9 of an exemplary method of fabricating an array substrate according to the present invention.

In FIGS. 10A, 11A, and 12A, a first metal layer may be deposited onto a surface of a substrate 100, and patterned to form a gate line 104 (in FIG. 9), a gate electrode 102, and a gate pad 106 on the substrate 100. The gate pad 106 may be disposed at an end portion of the gate line 104 (In FIG. 9), and the gate electrode 102 may extend from the gate line. The first metal layer may be one of aluminum-based material(s), such as aluminum (Al) or an aluminum-alloy such as aluminum neodymium (AlNd), having low electrical resistance in order to prevent signal delay. Although the aluminum-based material, aluminum (Al), aluminum-alloy, or aluminum neodymium (AlNd), may have low electrical resistance, they are chemically weak against developer and etchant materials used to fabricating the array substrate. For example, although aluminum in the gate line reduces an RC delay due to its low resistance, aluminum is sensitive to acidity and susceptible to developing hillocks during high temperature fabrication processes or patterning processes, thereby creating line defects. Accordingly, chromium (Cr) or molybdenum (Mo) may be additionally formed on the first metal layer to protect the aluminum-based first metal layer from the developer and etchant materials. Thus, the gate line 104 (In FIG. 9), the gate electrode 102, and the gate pad 106 may have a double-layered structure to include at least one of chromium (Cr) or molybdenum (Mo).

Then, a gate insulating layer 108 may be formed on the substrate 100 to cover the gate line 104 (In FIG. 9), the gate electrode 102, and the gate pad 106. The gate insulating layer 108 may fully cover the gate electrode 102, the gate line 104 (in FIG. 9), and the gate pad 106, and may include inorganic material(s), such as silicon nitride ($SiN_x$) and silicon oxide ($SiO_2$).

Figure 10B:
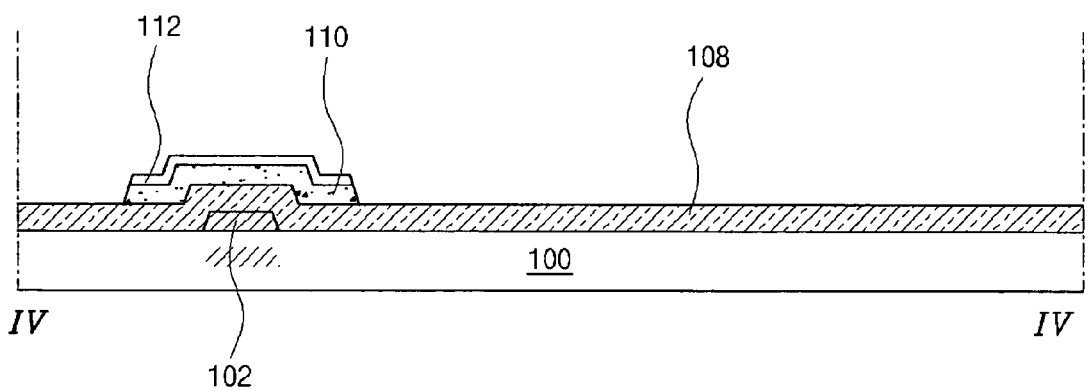

In FIGS. 10B, 11B, and 12B, an intrinsic amorphous silicon layer, such as a—Si:H, and a doped amorphous silicon layer, such as $n^+$a—Si:H, may be sequentially deposited along an entire surface of the gate insulating layer 108, and may be simultaneously patterned using a mask process to form an active layer 110 and an ohmic contact layer 112. For example, the ohmic contact layer 112 may be located on the active layer 110 over the gate electrode 102.

Figure 10C:
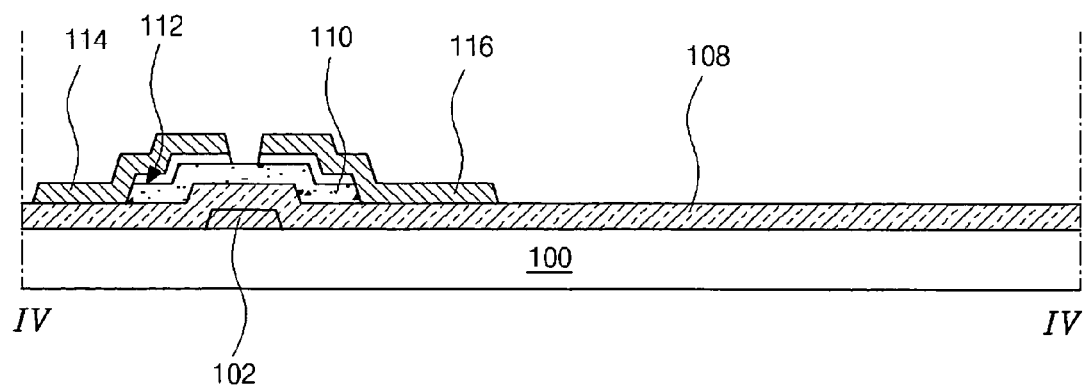

In FIGS. 10C, 11C, and 12C, a second metal layer may be formed on the gate insulating layer 108 to cover both the active layer 110 and the ohmic contact layer 112. For example, the second metal layer may include molybdenum (Mo), titanium (Ti), copper (Cu), tungsten (W), and/or chromium (Cr). Then, the second metal layer may be patterned to form a source electrode 114, a drain electrode 116, a data line 118, and a data pad 120 over the substrate 100. The source electrode 114 may extend from the data line 118 and may contact a first portion of the ohmic contact layer 112. The drain electrode 116 may be spaced apart from the source electrode 114 across the gate electrode 102 and may contact a second portion of the ohmic contact layer 112. In addition, the data pad 120 may be provided at an end portion of the data line 118. After forming the source and drain electrodes 114 and 116, a portion of the ohmic contact layer 112 located between the source and drain electrodes 114 and 116 may be removed at a region corresponding to a channel region of the active layer 110. Accordingly, formation of the channel region may include using the source and drain electrodes 114 and 116 as masks.

Figure 10D:
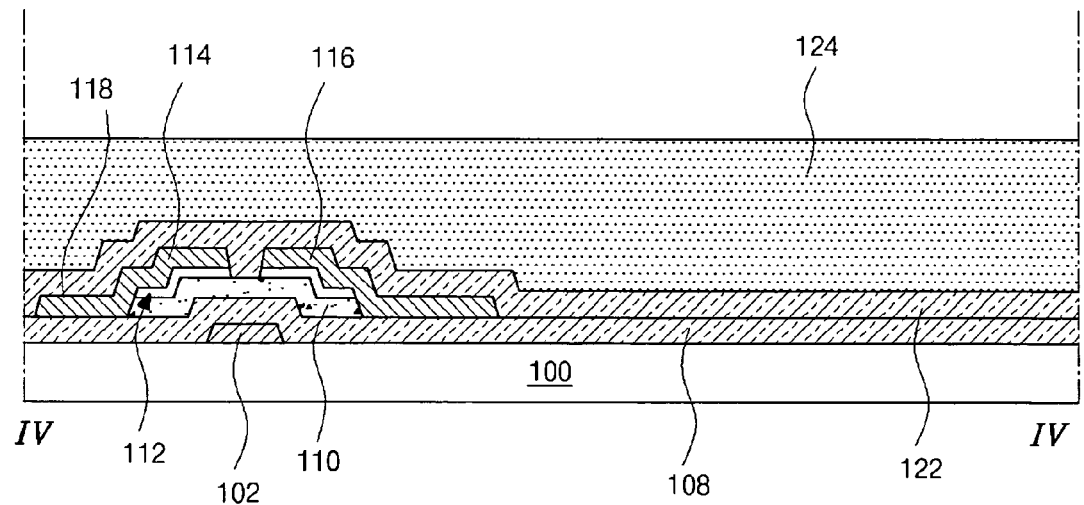

In FIGS. 10D, 11D, and 12D, first and second passivation layers 122 and 114 may be sequentially formed along an entire surface of the substrate 100 to cover the source and drain electrodes 114 and 116, the data line 118, and the data pad 120. For example, the first passivation layer 122 may be an inorganic material, such as silicon nitride ($SiN_x$) or silicon oxide ($SiO_2$), and the second passivation layer 124 may be an organic material, such as benzocyclobutene (BCB) or an acrylic resin. Since the first passivation layer 122 of inorganic material may be interposed between the exposed portion of the active layer 110 and the organic second passivation layer 124, a trap potential for trapping carriers within the channel region may be minimized.

Figure 10E:
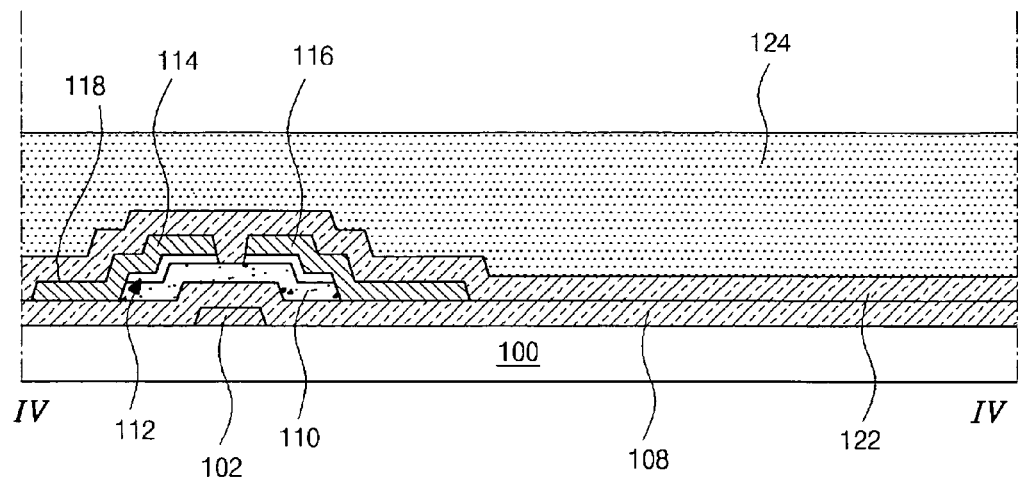

In FIGS. 10E, 11E, and 12E, portions of the second passivation layer 124 may be removed by an etching process. For example, the portions corresponding to the gate and data pads 106 and 120 may be completely removed to expose the underlying first passivation layer 122. In addition, although the portion of the second passivation layer 124 within the pixel region may not be removed, the portions within the gate and data regions may be completely removed, as shown in FIGS. 11E and 12E.

Figure 10F:
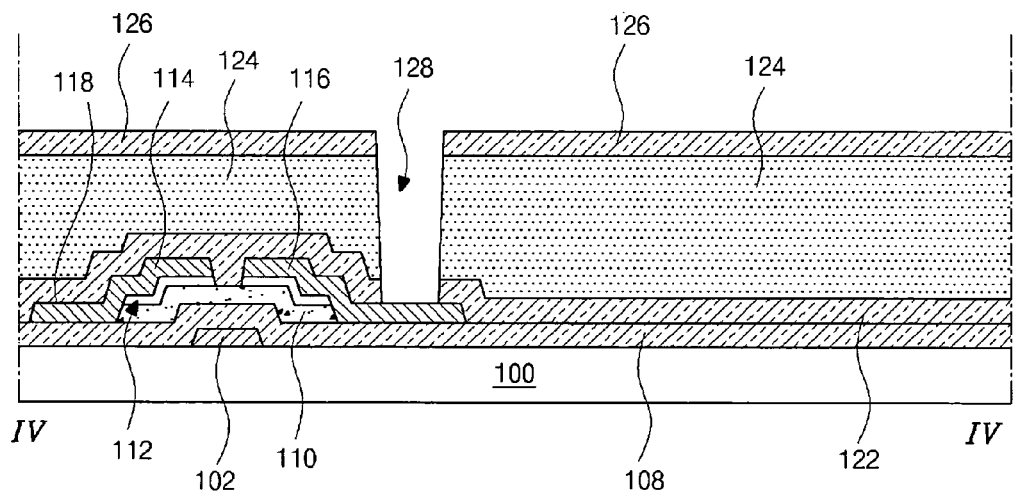

In FIGS. 10F, 11F, and 12F, a third passivation layer 126 may be formed along an entire surface of the substrate 100 to cover the patterned second passivation layer 124. The third passivation layer 126 may be, for example, silicon nitride ($SiN_x$) or silicon oxide ($SiO_2$), and may protect the channel region of the active layer 110 from light incident. Accordingly, if the incident light irradiates the channel region between the source and drain electrodes 114 and 116, a photocurrent is generated within the active layer 110 and causes a leakage current in the TFT T.

Next, the first, second, and third passivation layers 122, 124, and 126 may be simultaneously patterned to form a drain contact hole 128, a gate pad contact hole 130, and a data pad contact hole 132. Accordingly, a portion of the gate insulating layer 108 underneath the gate pad contact hole 130 may also be removed to expose the gate pad 106. The drain contact hole 128 may penetrate through the first, second, and third passivation layers 122, 124, and 126, and may expose a portion of the drain electrode 116. The gate pad contact hole 130 may penetrate through the gate insulating layer 108 and the first and third passivation layers 122 and 126, thereby exposing a portion of the gate pad 106. The data pad contact hole 132 may penetrate through the first and third passivation layers 122 and 126, thereby exposing a portion of the data pad 120.

Figure 10G:
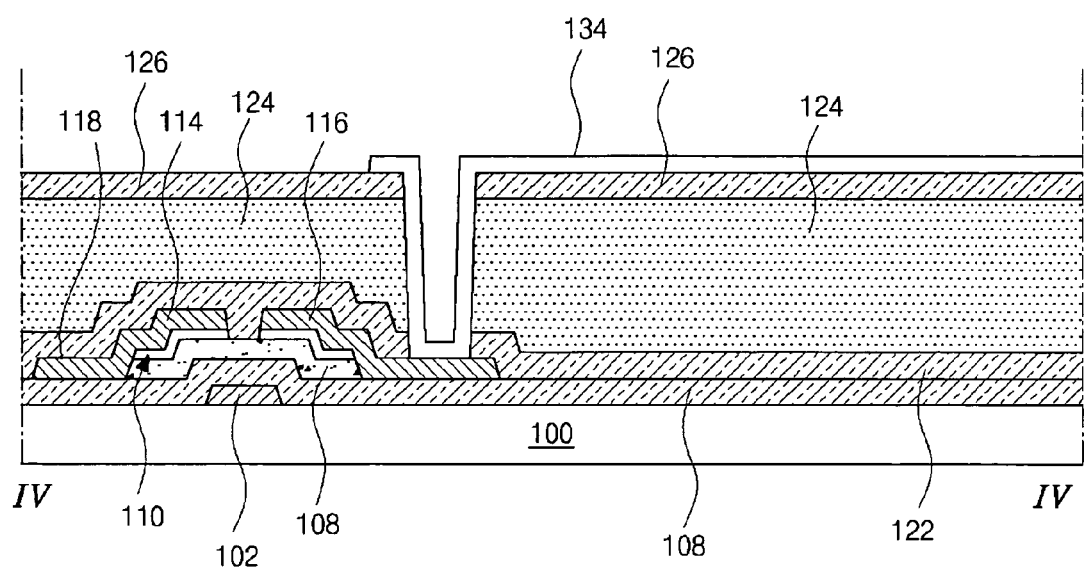

In FIGS. 10G, 11G, and 12G, a transparent conductive material may be deposited over the patterned third passivation layer 126 including the drain contact hole 128, the gate pad contact hole 130, and the data pad contact hole 132. Then, the transparent conductive material may be patterned to form a pixel electrode 134, a gate pad terminal 136, and a data pad terminal 138. The transparent conductive material may include one of indium tin oxide (ITO) and indium zinc oxide (IZO). The pixel electrode 134 may contact the drain electrode 116 through the drain contact hole 128, the gate pad terminal 136 may contact the gate pad 106 through the gate pad contact hole 130, and the data pad terminal 138 may contact the data pad 120 through the data pad contact hole 132.

FIG. 13 is a cross sectional view along V—V of FIG. 9 of an exemplary gate pad region during application of an IC chip according to the present invention. In FIG. 13, a gate pad region may not include an organic second passivation layer 134, wherein layers formed on a gate pad 106 may only comprise inorganic material(s), such as silicon nitride ($SiN_x$) or silicon oxide ($SiO_2$). For example, a gate insulating layer 108 and first and third passivation layers 122 and 126 may be formed over a gate pad 106, and may not have an etch selectivity difference since these layers are formed of the same material. Accordingly, a gate pad terminal 136 may be stably and firmly attached to the gate pad 106 without creating any cracks or causing any damage to the gate pad 106. Furthermore, when an IC chip 220 having a bump 220a is applied to the gate pad 106, the IC chip 220 may be in electrical communication with the gate pad 106 through the gate pad terminal 136 and the bump 220a. Accordingly, since re-work processing is not required, manufacturing yield increases. Furthermore, an LCD device including the array substrate described above can display images having improved quality.

It will be apparent to those skilled in the art that various modifications and variations can be made in the chip-on-glass (COG) array substrate of an LCD device and a method of fabricating a chip-on-glass (COG) array substrate of an LCD device of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate device for a liquid crystal display device, comprising:
    forming a gate line and a gate pad on a substrate, the gate line disposed along a first direction and the gate pad is connected to a first end of the gate line;
    forming a gate insulating layer over the substrate to cover the gate line and the gate pad;
    forming a data line and a data pad over the gate insulating layer, the data line disposed along a second direction to cross the gate line to define a pixel region, and the data pad is connected to a first end of the data line;
    forming a thin film transistor at a crossing region of the gate and data lines;
    sequentially forming a first inorganic insulating layer and a first organic insulating layer over the substrate to cover the thin film transistor, the data line, and the data pad;
    patterning the first organic insulating layer to expose portions of the first inorganic insulating layer corresponding to the gate and data pads;
    forming a second inorganic insulating layer over the patterned first organic insulating layer and over the exposed portions of the first organic insulating layer;
    simultaneously patterning the second inorganic insulating layer, the first organic insulating layer, and the first inorganic insulating layer to form first, second, and third contact holes; and
    forming a transparent pixel electrode, and a transparent gate pad terminal, and a data pad terminal over the second inorganic insulating layer,
    wherein the pixel electrode contacts a portion of the thin film transistor through the first contact hole, and the gate pad terminal and data pad terminal contact the gate and data pads through the second and third contact holes, respectively.

2. The method according to claim 1, further comprising forming gate and data driving IC chips connected to the gate and data terminals, respectively, through electrically conductive bumps.

3. The method according to claim 1, wherein the first and second inorganic insulating layers include one of silicon nitride and silicon oxide, and the first organic insulating layer includes one of benzocyclobutene (BCB) and acrylic resin.

4. The method according to claim 1, wherein the first contact hole penetrates through the first and second inorganic insulating layers and the first organic insulating layer to expose a portion of the thin film transistor.

5. The method according to claim 1, wherein the second contact hole penetrates through the gate insulating layer and the first and second inorganic insulating layers to expose a portion of the gate pad.

6. The method according to claim 1, wherein the second contact hole penetrates through the first and second inorganic insulating layers to expose a portion of the data pad.

7. The method according to claim 1, wherein the thin film transistor includes a gate electrode, an active layer, an ohmic contact layer, a source electrode, and a drain electrode, and wherein the pixel electrode contacts the drain electrode.

* * * * *